F. PRESTON.
JOINTS OF PIANO ACTIONS.

No. 181,866.          Patented Sept. 5, 1876.

WITNESSES:
A. W. Almqvist
John Goethals

INVENTOR:
F. Preston
BY
ATTORNEYS.

UNITED STATES PATENT OFFICE.

FRANK PRESTON, OF ELGIN, ILLINOIS.

IMPROVEMENT IN JOINTS OF PIANO-ACTIONS.

Specification forming part of Letters Patent No. 181,866, dated September 5, 1876; application filed February 28, 1876.

*To all whom it may concern:*

Be it known that I, FRANK PRESTON, of Elgin, in the county of Kane and State of Illinois, have invented a new and Improved Metallic Joint for Piano-Hammers and other Devices, of which the following is a specification:

My invention consists of a pivot-pin for the hammer, or other device, pointed at each end and fitted in a bush having a conical seat for the point, and screwed into the bearings, in which it is held firmly by a clamp contrivance to prevent it from turning after being adjusted, the oject being to provide a joint that cannot be affected by dampness, to which the common joints are subject, in consequence of the felt being used in the bearings, which readily absorbs moisture, and swells so as to make the joint too tight. The joint is also applicable to the part called the jack, which strikes the hammer-flange, and it may also be used for other devices.

Figure 1:
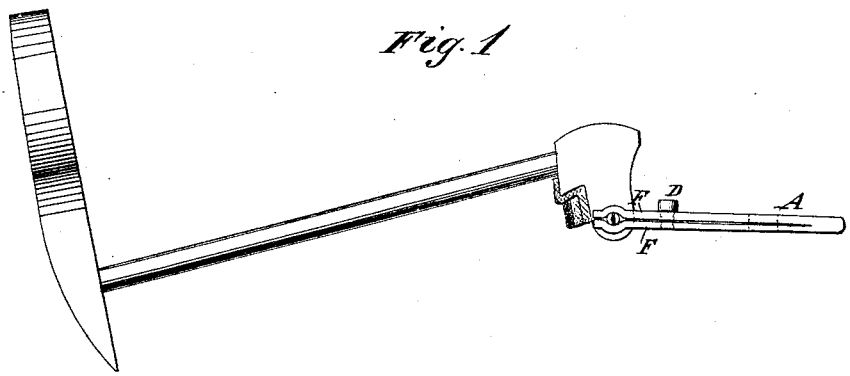
Figure 2:
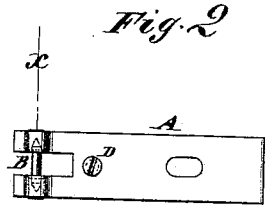
Figure 3:

Figure 1 is a side elevation of a piano-hammer joint contrived according to my invention. Fig. 2 is a plan of the bearing-plate, in which the hammer is pivoted, and Fig. 3 is a section on the line *x x* of Fig. 1.

Similar letters of reference indicate corresponding parts.

A is the bearing-plate, in which the pivot B, having conical ends, is fitted by a metal bush, C, for each end having a conical socket corresponding to the conical end of the pivot, and screwing in the bearings between the two parts F, which are firmly clamped on the bushes by the screw D, to hold them fast after being adjusted. The slack can be taken up at any time by this contrivance, and thus the metallic joint may be made as tight and noiseless as the felt-lined joint commonly used.

It can be applied to pianos now in use, as well as to new ones.

Having thus described my invention, what I claim as new, and desire to secure by Letters Patent, is—

The combination of the screw-threaded bushes C, having conical sockets, with the pivot B, having conical ends, and the clamping bearing-plate A, substantially as specified.

FRANK PRESTON.

Witnesses:
 JOHN S. ADAMS,
 T. SILVER.